United States Patent
Weinig et al.

(10) Patent No.: US 11,258,866 B2
(45) Date of Patent: Feb. 22, 2022

(54) WEB RESOURCE LOAD BLOCKING API

(71) Applicant: Apple Inc., Cupertino, CA (US)

(72) Inventors: Samuel M. Weinig, Sunnyvale, CA (US); Jessie Berlin, Santa Clara, CA (US); Benjamin Poulain, Cupertino, CA (US); Adele Peterson, Los Gatos, CA (US); Brian Weinstein, San Jose, CA (US); Richard Mondello, Cupertino, CA (US); Alex Christensen, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/791,624

(22) Filed: Feb. 14, 2020

(65) Prior Publication Data
US 2020/0259905 A1 Aug. 13, 2020

Related U.S. Application Data

(63) Continuation of application No. 14/732,315, filed on Jun. 5, 2015, now Pat. No. 10,567,517.

(51) Int. Cl.
*H04L 29/08* (2006.01)
*H04L 67/51* (2022.01)

(52) U.S. Cl.
CPC ................................ *H04L 67/16* (2013.01)

(58) Field of Classification Search
CPC ........................................................ H04L 67/16
See application file for complete search history.

(56) References Cited

U.S. PATENT DOCUMENTS

| | | | |
|---|---|---|---|
| 6,721,804 B1 | 4/2004 | Rubin et al. | |
| 7,805,531 B2 | 9/2010 | Groll et al. | |
| 8,200,962 B1 * | 6/2012 | Boodman | H04L 63/0823 713/161 |
| 8,387,140 B2 | 2/2013 | Ko et al. | |
| 8,527,504 B1 | 9/2013 | Krishnamurthy | |
| 8,752,016 B2 * | 6/2014 | Hernandez Porras | G06F 8/71 717/122 |
| 9,684,636 B2 | 6/2017 | Liang et al. | |

(Continued)

OTHER PUBLICATIONS

Adguard, "How ad blocking works", Aug. 16, 2013.

(Continued)

*Primary Examiner* — Joe Chacko
(74) *Attorney, Agent, or Firm* — Womble Bond Dickinson (US) LLP

(57) ABSTRACT

In various embodiments described herein, a content extension and programming interface enable third-party content extensions to supply transformation and filtering actions and associated criteria to native web clients on a system. In one embodiment, the native web client loads data for a third-party content filtering, blocking, or transformation extension and conducts extension defined actions without requiring additional intermediation by the third-party content. In one embodiment, a third-party application downloaded to a mobile or handheld device can include an extension data object that provides actions and triggers that are loaded by a native web client of the system. The third-party application is not required to execute continuously and can exit or be terminated once the web client retrieves the extension data object.

15 Claims, 13 Drawing Sheets

(56) References Cited

U.S. PATENT DOCUMENTS

| | | | |
|---|---|---|---|
| 2003/0009495 A1 | 1/2003 | Adjaoute | |
| 2004/0143823 A1* | 7/2004 | Wei | G06F 8/41 |
| | | | 717/140 |
| 2007/0028223 A1* | 2/2007 | Meijer | G06F 8/427 |
| | | | 717/140 |
| 2010/0153929 A1 | 6/2010 | Porras et al. | |
| 2010/0207946 A1 | 8/2010 | Roseborough et al. | |
| 2010/0235819 A1 | 9/2010 | Rose | |
| 2013/0205282 A1 | 8/2013 | Lafreniere et al. | |
| 2013/0254855 A1 | 9/2013 | Walters et al. | |
| 2015/0082151 A1 | 3/2015 | Liang et al. | |
| 2015/0277866 A1 | 10/2015 | Wang et al. | |
| 2017/0351644 A1 | 12/2017 | Liang et al. | |

OTHER PUBLICATIONS

Adguard, URL "https://cdn.adguard.com/public/Adguard/En/Extension-integration-mode/", Mar. 27, 2015.

\* cited by examiner

WEB RESOURCE LOAD BLOCKING API

This application is a continuation of co-pending U.S. application Ser. No. 14/732,315 filed Jun. 5, 2015, which is incorporated herein by reference.

BACKGROUND OF THE DISCLOSURE

Content-control software may be used to control, restrict, or filter material delivered to or displayed on a web client, such as a hypertext transport protocol (e.g., HTTP) client or web browser. Content filtering may be performed for one of several reasons including restricting or limiting the web sites or web content that is available to a web client at a particular location, such as at a school or office environments. Some content-controlling filters operate as a proxy server that can cache or filter content before it is displayed on a user's browser. However, some content filters, particularly advertisement blocking filters, may execute locally on a data processing system as a separate process from the web browser or web client that is used to access online resources. Local execution may cause issues on some environments, particularly mobile or handheld devices with limited memory or computing resources, as the resource requirements for the separate content filter process may negatively impact performance. In some situations, the resource requirements imposed by local execution of third-party web content filter plug-ins can hinder application performance even on laptop or desktop environments with a larger amount of memory and computing resources.

SUMMARY OF THE DESCRIPTION

A summary of certain embodiments disclosed herein is set forth below. It should be understood that these aspects are presented to provide the reader with a brief summary of these certain embodiments. The aspects described below are not intended to limit the scope of this disclosure. The various features of the embodiments may be variously combined with some features included and others excluded to suit a variety of different applications.

In one embodiment, a non-transitory computer readable medium stores instructions which, when executed by one or more processors of a data processing system, cause the one or more processors to perform several operations related to a web resource load blocking API. The operations comprise, but are not limited to requesting a web content filter extension via a content extension programming interface, receiving a data object in response to the request, the data object including one or more actions, each action having zero or more triggers. In one embodiment, an action can have an implicit trigger that is not explicitly specified. The operations further comprise, compiling the data object into a compiled data object, storing the compiled data object in memory, and mapping the memory storing the compiled data object into an address space of a web content process associated with a web client. In one embodiment the web content process is configured to perform the one or more of the actions defined in the data object in response to the zero or more triggers.

One embodiment is a machine implemented method on an electronic device having one or more processors, where the method comprises receiving a request to load a web content resource, deriving an action and a trigger from a memory mapped data object associated with a web content filter extension, comparing attributes of the web content resource to an explicit or implicit trigger, and applying the action based on the comparing, the action including blocking load of the web content resource. In one embodiment, blocking the load of the web content resource includes preventing download of the web content resource from a remote content source, the web content resource including a hypertext document, an image, or a web cookie associated with the content source.

One embodiment is a data processing system comprising one or more processors coupled to memory, where the one or more processors are to execute instructions from the memory, and the instructions to cause the one or more processors to perform operations for a plurality of processes including a web client process to request a web content extension, receive a content extension filter object in response to the request, compile the content extension filter object into a compiled content extension filter object, and cause the compiled content extension filter object to be mapped to a virtual memory address, and one or more web content processes to load web content on behalf of the web client process, the one or more web content processes having access to the virtual memory address of the compiled content extension filter object, wherein the one or more web content processes are to compare web content resources to zero or more triggers defined in the compiled content extension filter object and apply one or more actions to the web content based on a comparison.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

In the figures of the accompanying drawings, like references indicate similar elements. A letter after a reference numeral indicates a reference to a particular element. A reference numeral without a following letter refers to any or all of the elements in the figures bearing that reference numeral. The figures are to illustrate the various embodiments by way of example, and not limitation, in which.

DETAILED DESCRIPTION

Figure 1A:
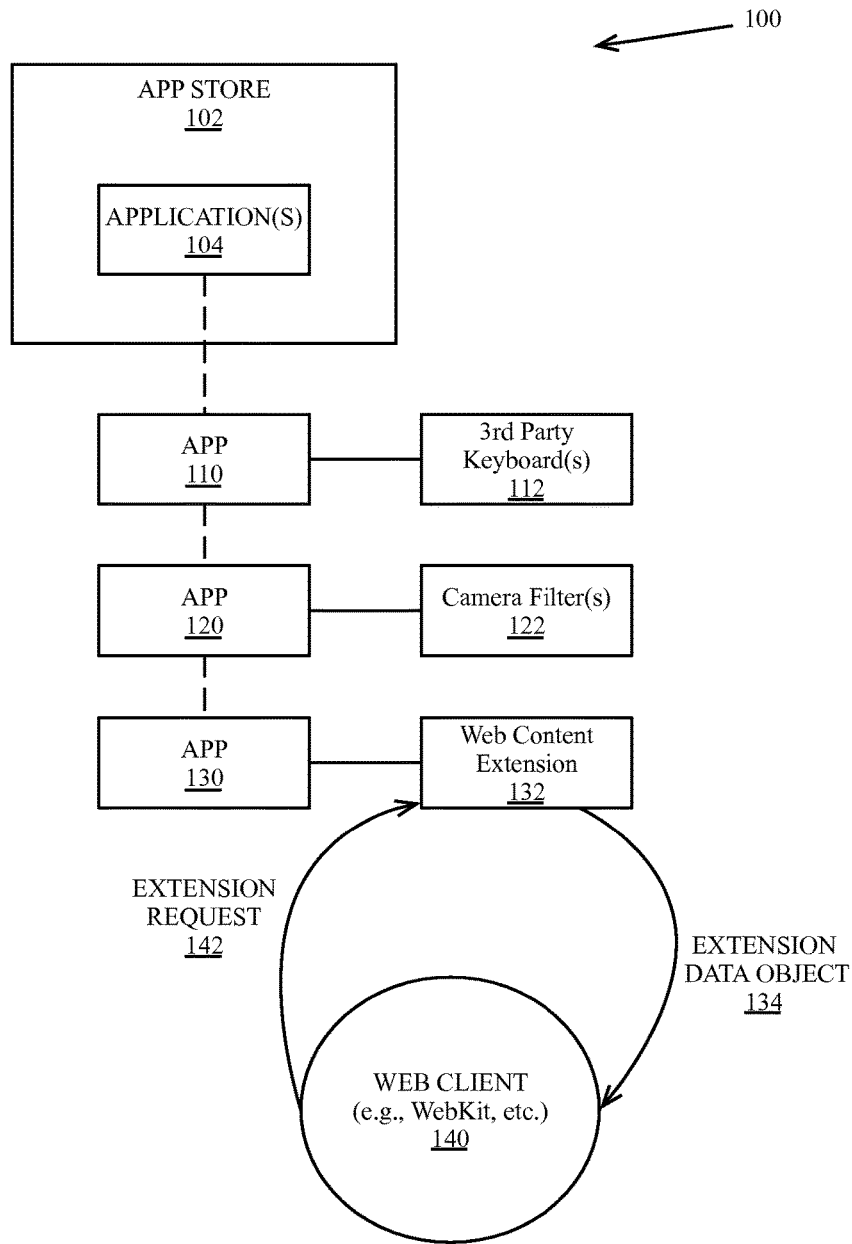
FIGS. 1A-B are block diagrams of an extension system of a mobile data processing system, according to embodiments.

Described herein is a content filter extension and programming interface to enable third-party content filters to supply filtering and transformation actions and associated criteria to native portions of a web client on a data processing system. As used herein, the native portion of the web client refers to the data and instructions of a web client that are included by default, without extension by third-party plug-ins or extensions. In one embodiment, once the web client loads data for a third-party content filter, the web client may conduct content filtering operations without requiring additional intermediation by the third-party content filtering logic. In one embodiment, a mobile or handheld computing device, such as on a smartphone or tablet computing device, enables the download of third-party applications having various system extensions (e.g., third-party keyboards, camera filters, etc.) from an app store. The third-party application can include an extension data object that provides actions and triggers that can be loaded by the web client of the system. The actions and triggers can define third-party web-content filter definitions that are performed by the native portion of the web client. Each action can have zero or more associated triggers, where an action with zero triggers is performed in response to an implicit trigger defined for the specific action.

To receive the extension data object, the web client can trigger the execution of the third-party application extension and request an extension data object via a content extension application programming interface (API). The third-party application extension is not required to execute continuously and can exit or be terminated once the web client retrieves the extension data object. In one embodiment, web clients executing on laptop or desktop data processing system may be configured to communicate directly with a third-party extension to retrieve an extension data object via an extension interface that is specific to the web client.

The extension data object can be in JavaScript Object Notation (JSON) format, or some other object notation format (e.g., YAML, XML, etc.) that is suitable to convey a list of web content based actions and triggers to the native web client. In one embodiment, the extension data object can be compiled into a compiled data object. For example, a JSON object can be compiled in a bytecode and stored in non-volatile memory of the data processing system.

The non-volatile memory addresses storing the compiled data object can be mapped via virtual memory into the process virtual memory space of one or more web content processes, which load and process resources in a parallel manner on behalf of the web client. In one embodiment, a separate web content process may execute for each active web content source (e.g., website) that is displayed by the web browser. Each web content process can have read-only access the virtual memory space of the compiled data object (e.g., bytecode). The web content process can interpret the compiled data object to derive a set of actions and triggers (e.g., rules) to use when loading web resources, such as hypertext resources (e.g., HTML pages) provided by a webserver, or other web content provider.

When loading web content, each web content process can compare the web content or resource locator to be loaded to the triggers defined in by the compiled data object. If the web content or resource to be loaded matches the triggers associated with an action the web content process can perform the action. The actions include, but are not limited to blocking the load of a web resource, blocking the setting or reading of a web cookie associated with web content or the source of the web content, whitelisting a particular resource such that previously defined actions applied to the resource are ignored or rescinded, or injecting a style sheet (e.g., cascading style sheet) rule to modify the manner in which the web content or web resource is displayed by the web client, including hiding the web content or resource from display.

Additional details will also be disclosed with respect to enabling system extensions on a data processing system, as well as the underlying compilation, virtual memory resources, operating system resources, and data processing system hardware underlying the computing devices and data processing systems described herein. However, in certain instances, well-known or conventional details are not described in order to provide a concise discussion of the various embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

Figure 1B:
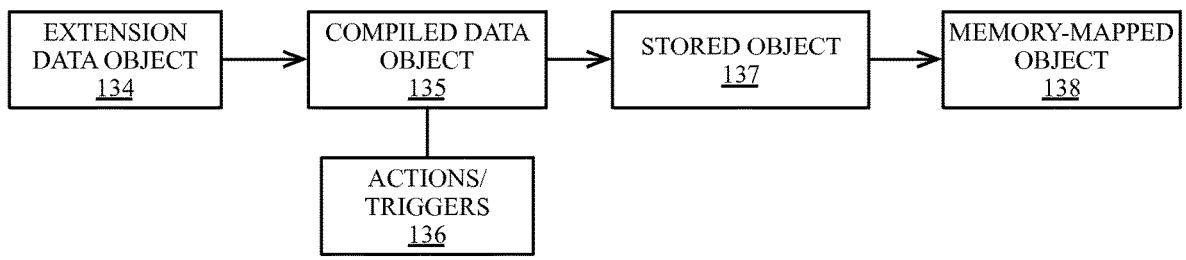

FIGS. 1A-B are block diagrams of an extension system 100 of a mobile data processing system, according to embodiments. FIG. 1A is an overview of the extension system 100. The extension system 100 includes an application (e.g., app) store 102, which can facilitate the purchase of one or more application(s) 104 for download and installation on an electronic device. In one embodiment, the application(s) 104 can be used to provide extensions for the operating system of the device. For example, a first application (e.g., app 110) can provide a third-party keyboard extension that to enable one or more third-party keyboard(s) 112. A second application (e.g., app 120) can provide one or more camera filter(s) 122. A third application (e.g., app 130) can provide a web content extension 132.

In one embodiment each extension executes in a sandbox environment in which the extensions have unrestricted access to resources within a sandbox container defined the extension but have no access or restricted access to other system resources or user data. The sandbox container contains the instructions and data used to initialize and execute the extension and the extension can communicate with other processes via an XPC interprocess communication service. The XPC service works with the sandbox system to enable privilege separation between the extension and the processes with which the extension communicates. Inter process messages transmitted via the XPC service can be dispatched via a central dispatch system.

In one embodiment, each of the third-party keyboard(s) 112 and camera filters(s) 122 are processes that execute continuously while in use, while the web content extension 132 executes to provide web content filtering, modification, or injection configuration information to a native web client 140 and can exit or be terminated once the content extension information is provided. In one embodiment, the content filter information is provided to the web client 140 in response to an extension request 142 sent from the web client 140. The application (e.g., app 130) includes the web content extension 132. The web content extension 132 can receive the extension request 142 from the web client and can pass an extension data object 134 to the web client 140. In one embodiment, the extension request 142 and extension data object 134 are exchanged via an XPC service.

The web client 140 can be a native web client based on any one or more layout engine software components for rendering web pages, such as WebKit, Blink, Gecko, etc., including the Safari Web Browser from Apple Inc. of Cupertino Calif. The extension data object 134 can be in JavaScript Object Notation (JSON) format, some other object notation format (e.g., YAML, XML, etc.), or a binary format.

The extension data object 134 can define one or more actions and associated triggers. In one embodiment, the actions and triggers can be defined in a human-readable format that may also be parsed or compiled by the web client 140. An action is an activity that is to be performed by the web client 140 and a trigger is a condition that causes the activity to be performed. In one embodiment, an action can be defined to block the load of a resource. Other actions can be defined, including but not limited to blocking the setting or reading of a web cookie associated with web content or the source of the web content, whitelisting a particular resource such that previously defined actions applied to the resource are ignored or rescinded, or injecting a style sheet rule to modify the manner in which the web content or web resource is displayed by the web client, including hiding the web content or resource from display.

In one embodiment, the trigger can include a uniform resource locator (URL) filter that specifies that web client 140 is to trigger is to be performed on all resources having a source address that matches the specified URL filter. The trigger can further specify a type of resource to block, such as an image resource or a hypertext documents. In various embodiments, other types of filters and resource-types can be defined, and the filters and resource types supported can be extendable across successive versions of the web client 140.

An exemplary action and trigger within an extension data object 134 is shown in Table 1 below.

TABLE 1

Exemplary Extension Data Object Actions and Triggers

{
  "action": {
    "type": "block"
  },

TABLE 1-continued

Exemplary Extension Data Object Actions and Triggers

"trigger": {
    "url-filter": ".*webkit.org",
    "resource-type": ["image"]
  }
}

Table 1 illustrates an exemplary "block" action to prevent the loading of a resource. The exemplary block is performed in response to one or more "triggers", including the exemplary trigger shown. In one embodiment, when the specific exemplary extension data object 134 of Table 1 is compiled and loaded, the web client 140 will perform a block action upon load of all image resources to be loaded from a URL including the string "webkit.org." One or more actions that may be defined by the extension data object can be performed in response to implicit triggers that are not explicitly specified by the extension data object.

FIG. 1B illustrates data flow for the extension data object, according to an embodiment. In one embodiment, the web client 140, in response to an extension request 142, receives an extension data object 134. The extension data object 134, in one embodiment, can be complied into a compiled object that can be executed or interpreted by program code associated with the web client 140. The compiled object can present the actions and triggers 136 of the extension data object 134 in a format that can be utilized programmatically by the web client 140. For example, a JSON object can be compiled in a bytecode, which can be interpreted by an interpreter associated with the web client 140.

In one embodiment, the compiled data object 135 can be stored as a stored object 137 within non-volatile storage (e.g., flash memory) of an electronic device. Once stored in non-volatile memory, the stored object 137 can be mapped into memory as a memory-mapped object 138 using a virtual memory system of the electronic device. The memory-mapped object 138 can be a shared memory mapped object, which can be mapped into the process memory of multiple processes associated with the web client 140.

The non-volatile memory addresses of the stored object 137 are mapped via virtual memory into the process virtual memory space of one or more web content processes. In one embodiment, the web content processes are separate processes that load and process resources in a parallel manner on behalf of the web client. In one embodiment, a separate web content process may execute for each active web content source (e.g., website) that is displayed by the web browser. Each web content process can have read-only access the virtual memory space of the compiled data object (e.g., bytecode). The web content process can interpret the compiled data object to derive a set of actions and triggers (e.g., rules) to use when loading web resources, such as hypertext resources (e.g., HTML pages) provided by a webserver, or other web content provider.

Figure 2B:
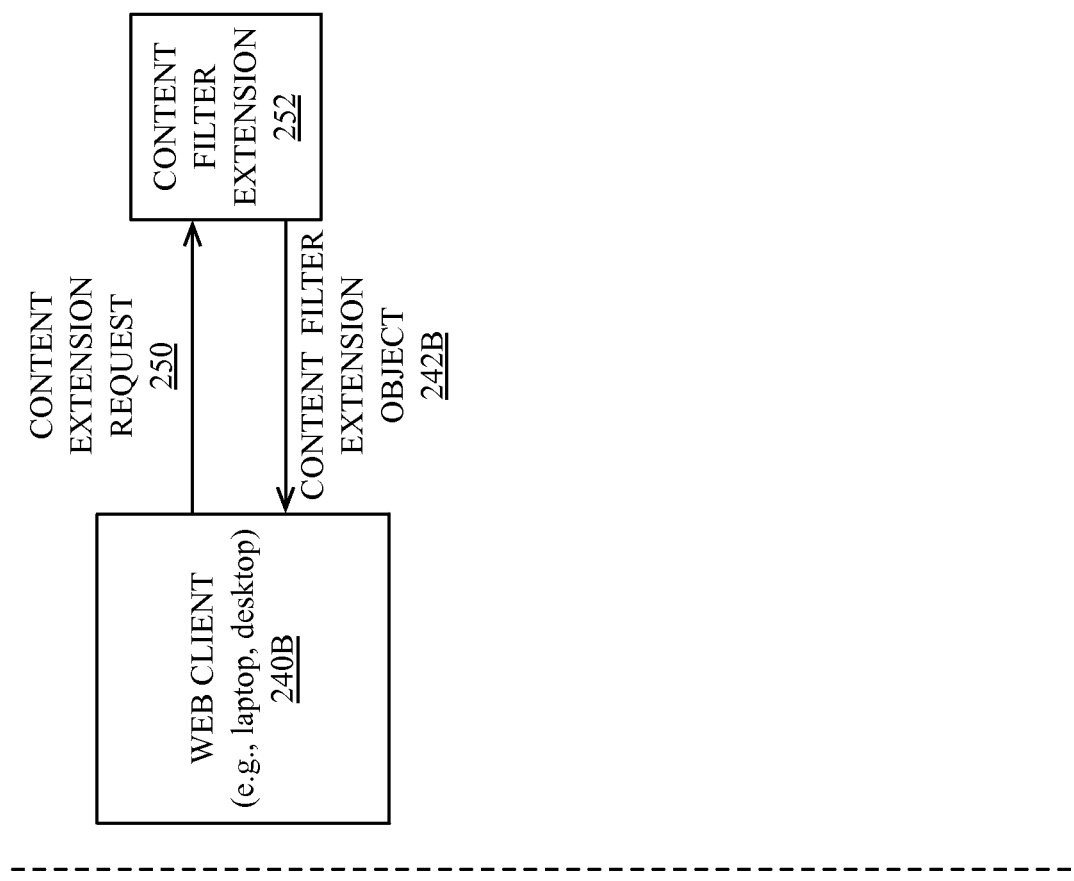
FIGS. 2A-B are block diagrams of interactions to enable a web client to retrieve a content extension of a processing system, according to embodiments.
Figure 2A:
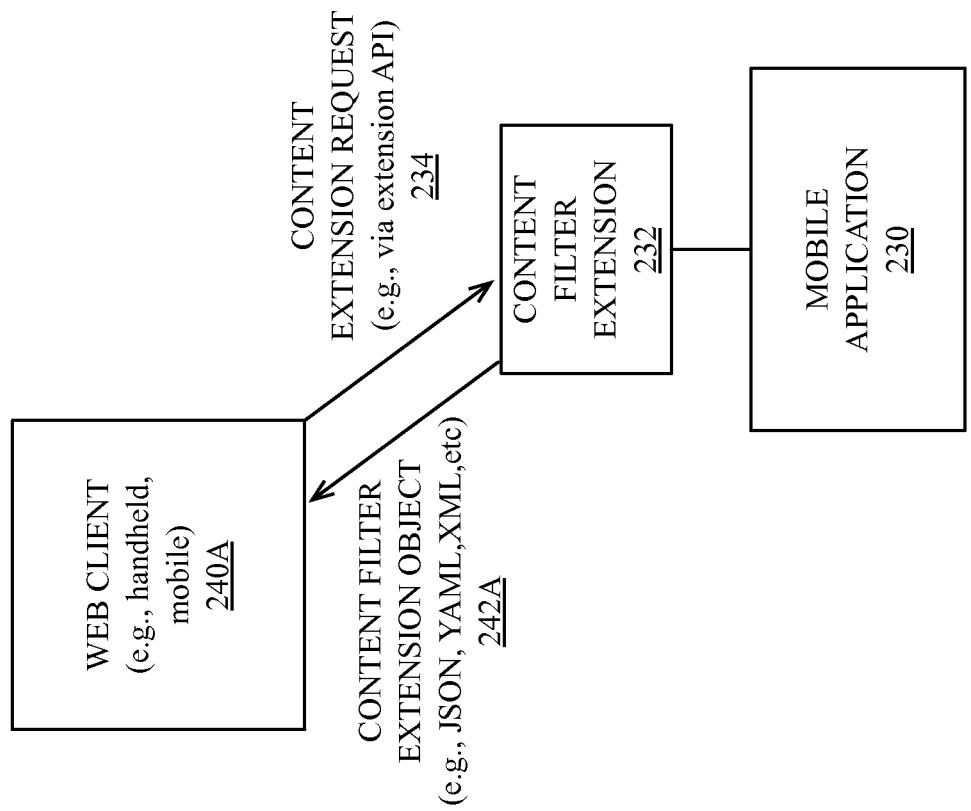

FIGS. 2A-B are block diagrams of interactions to enable a web client to retrieve a content extension of a processing system, according to embodiments. FIG. 2A illustrates an exemplary API interaction between a content filter extension 232 and a mobile or handheld web client 240A. While a content filter extension 232 is illustrated, other web content extensions may be configured to perform actions beyond filtering, including adding or transforming web content. In one embodiment, a content extension request 234 can be transmitted via a system wide extension API to a content filter extension 232 provided by a mobile application 230. In one embodiment, the mobile application 230 has been previously downloaded from an app store, such as the app store 102 of FIG. 1A. In one embodiment, the mobile application 230 is not executed, but merely provides a delivery mechanism for the content filter extension 232, which is executed to response to the content filter extension request. An alternate implementation may provide for the mobile application 230 to relay content filter extension requests 234.

The mobile application 230 and/or the content filter extension 232 can provide a content filter extension object 242A to the web client. The format of the content filter extension object 242A can vary. In one embodiment, JSON is the acceptable format for a content filter extension object. In other embodiments, the content filter extension format may be formatted in the extensible markup language (XML), or other markup languages, such as the YAML markup language. In one embodiment, the content filter extension object has a binary format. Other formats may be used by various embodiments and implementations.

FIG. 2B illustrates an exemplary API interaction between a content filter extension 252 and a laptop or desktop web client 240B. In one embodiment, the laptop or desktop web client 240B interacts directly with a content filter extension 252 via the extension API, without the use of an intermediary, such as a mobile application 230, as with the handheld or mobile web client 240A of FIG. 2A. Instead, the web client 240B sends a content extension request 250 to a content filter extension 252 stored in an extension library on the laptop or desktop system. In response, the content filter extension supplies a content filter extension object 242B to the web client 240B. In one embodiment, the content filter extension object 242B that is provided to the laptop or desktop web client 240B is of a same or similar format as the content filter extension object 242A that is supplied to the mobile or handheld web client 240A, however the formats for each of the content filter extension objects 242A-B can be different in one embodiment. The content filter extension 252, in one embodiment, can be downloaded and/or updated via an online extension repository for the web client 240B, which may differ from the app store (e.g., app store 102) from which the mobile application 230 is obtained. In one embodiment, the content filter extension 232 of the mobile application 230 is formatted in the same or similar manner as the content filter extension 252 that is obtained from the online extension repository. In one embodiment, the content filter extension request 234 from the mobile or handheld web client 240A is similar and equivalent, but not identical to the content extension request 250 from the laptop or desktop web client 240B. In one embodiment the content extension requests 234, 250 have an identical format.

In one embodiment, the interactions shown in each of FIG. 2A and FIG. 2B occur on an ad-hoc basis, and do not occur on a regular basis, either during system runtime or during system load. Once the content filter extension object 242A-B is retrieved by the web client 240A-B, the interaction is not required to be repeated unless the content filter extension 232, 252 is updated. In one embodiment, the content filter extension 232 associated with the handheld or mobile web client 240A can be updated automatically by the mobile application 230, which can retrieve a new content filter extension 232 from a remote location. In one embodiment, the content filter extension 232 can be updated by updating the mobile application 230. In one embodiment, the content filter extension 252 associated with the laptop or desktop web client 240B can be updated automatically by the web client 240B, or a user can manually update the content filter extension 252 from an online extension library. In one embodiment, at least a portion of the content filter extension is in a human-readable format and can be edited by a user before loading or reloading the content filter extension 252.

Figure 3:
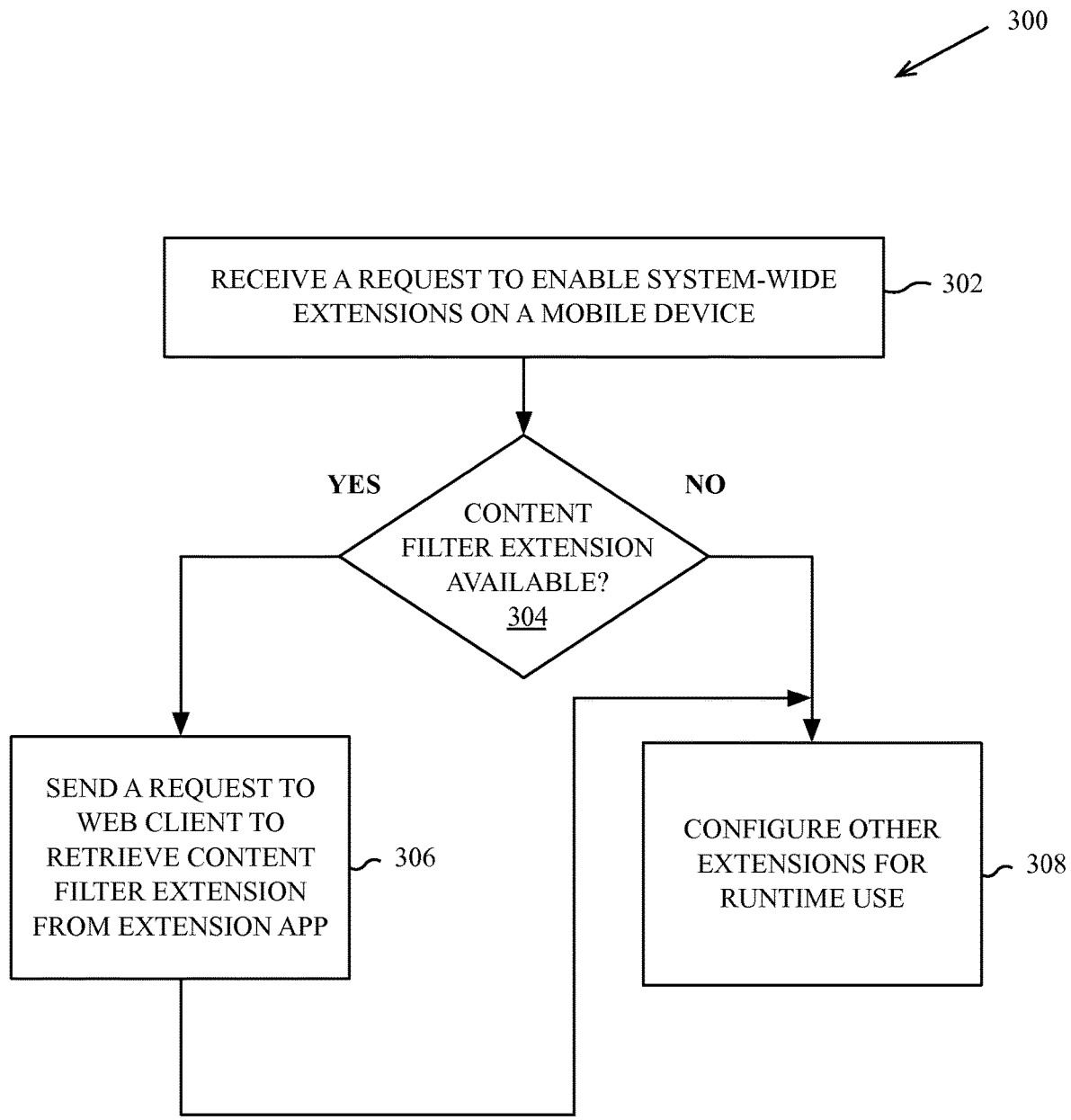
FIG. 3 is a flow diagram of logic to enable extensions on a mobile device, according to an embodiment.

FIG. 3 is a flow diagram of logic 300 to enable extensions on a mobile device, according to an embodiment. In one embodiment, content filter extensions are enabled or disabled on a mobile device in conjunction with other system wide extensions. The logic 300 can receive a request to enable system-wide extensions on a mobile device, as shown at block 302. In response to the request, the logic 300 can determine whether a content filter extension is available at block 304. A content filter extension can be determined to be available if a content filter extension application has been downloaded onto the system. When the content filter extension application is downloaded onto the system flag or attribute can be set that indicates that a content filter extension is available. While a system-wide request is shown at block 302, content filter extensions and other web content extensions can be enabled individually, such that a user can enable some web content extensions while disabling other web content extensions.

If a content filter extension is determined to be available at block 304, the logic 300 can send a request to the web client to retrieve the content filter extension from an extension application, as shown at block 306. In one embodiment, the web client retrieves the content filter extension in response to the request sent at block 306 and the logic 300 to enable extensions on the mobile device is not directly responsible for retrieving the content filter. In one embodiment, after a content filter extension is received, the system flag or attribute indicating that a content filter extension is available can be cleared, such that the request to retrieve the content filter extension is not performed again until or unless an update to the content filter extension is received. If a content filter extension is determined to not available at block 304, or after sending the request to the web client to retrieve the content filter extension from the extension application at block 306, the logic 300 can continue to configure other extensions for runtime use, as shown at block 308. The other extensions can include a camera filter extension, a keyboard extension, or other supported third-party system extensions.

Figure 4:
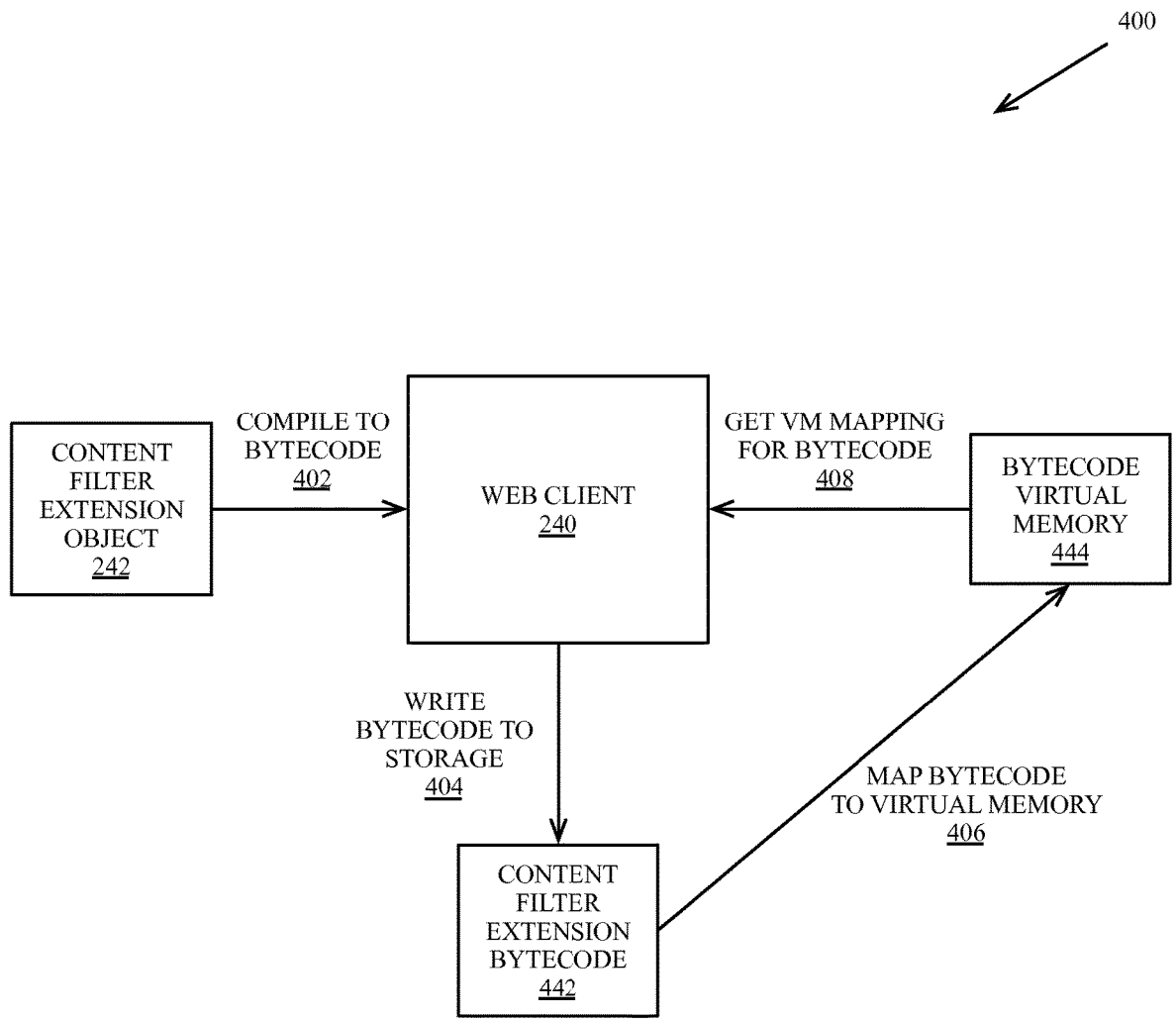
FIG. 4 is a block diagram of system architecture to map a content filter extension into virtual memory, according to an embodiment.

FIG. 4 is a block diagram of system architecture 400 to map a content filter extension into virtual memory, according to an embodiment. In one embodiment, the architecture 400 is a software architecture that enables a content filter extension object 242 (e.g., content filter extension object 242A-B of FIG. 2) that is retrieved from a content filter extension (e.g., content filter extension 232, 252 of FIG. 2) to be mapped into memory associated with a web client 240 (e.g., web client 240A-B of FIG. 2). The web client 240, having retrieved the content filter extension 242, and compile the content filter extension to bytecode 402 using one or more compiler resources available to the web client. The web client 240 can then write the bytecode to storage 404 as content filter extension bytecode 442. The content filter extension bytecode 442. In one embodiment, the content filter extension bytecode 442 is mapped to virtual memory 406 to become bytecode virtual memory 444. Once mapped as bytecode virtual memory 444, the web client can retrieve the virtual memory (VM) mapping for the bytecode 408. Additional details regarding the logic associated with the architecture 400 of FIG. 4 are discussed in FIG. 5 below.

Figure 5:
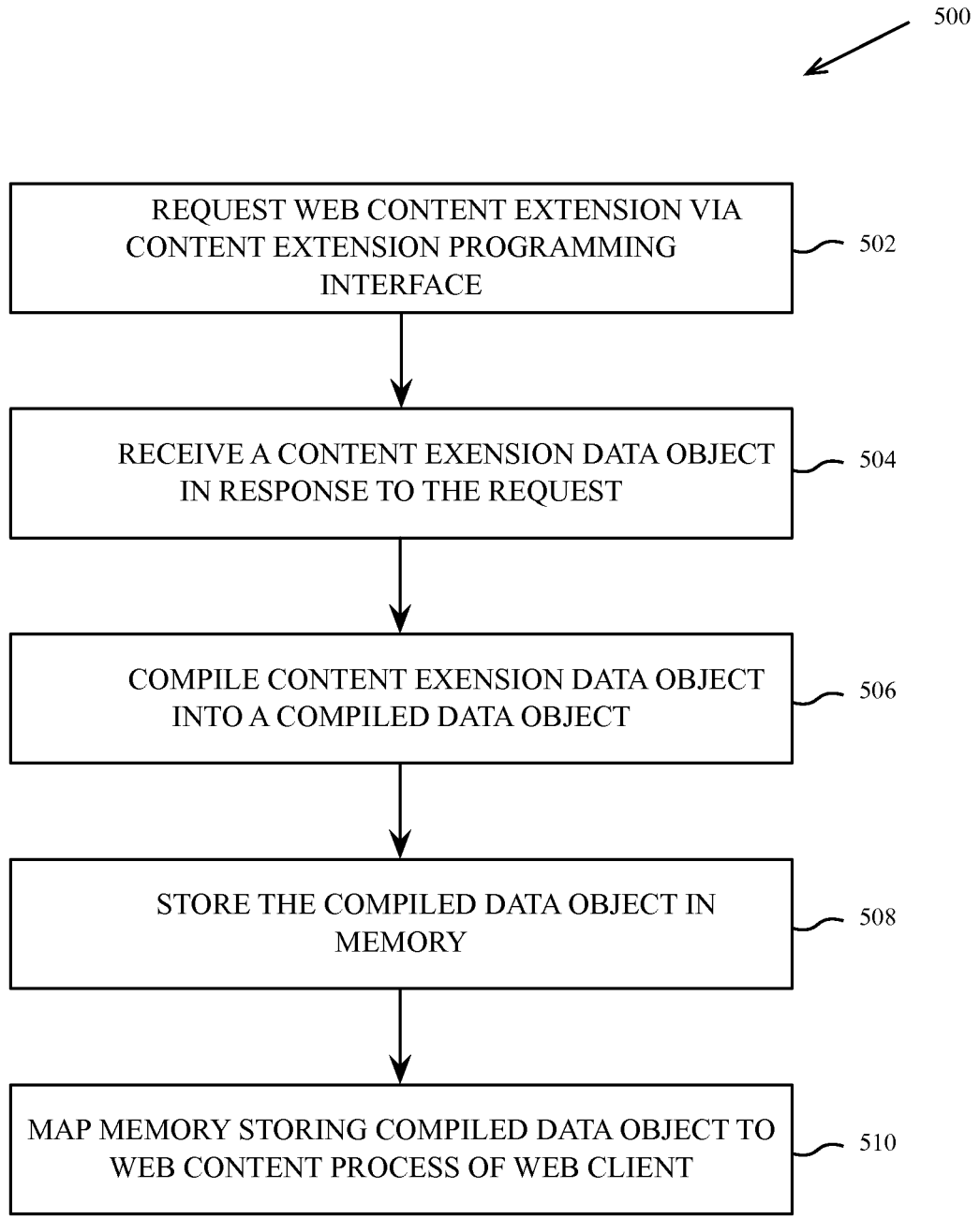
FIG. 5 is a flow diagram of logic to map a content filter extension into virtual memory, according to an embodiment.

FIG. 5 is a flow diagram of logic 500 to map a content filter extension into virtual memory, according to an embodiment. In one embodiment, the logic 500 can request a web content extension via a content extension programming interface, as shown at block 502. The logic 500 can use the content extension programming interface request the web content extension using a content extension request similar to the content filter extension requests 232, 252 shown in FIGS. 2A-B. The logic 500 can receive a content extension data object in response to the request, as shown at block 504. The logic 500 can further compile the content extension data object into a compiled data object, as shown at block 506. The logic 500 can further store the compiled data object in memory, as shown at block 508. Storing the compiled data object in memory can include one or more of storing the compiled data object to volatile memory and/or non-volatile memory. Once the compiled data object is stored in memory at block 508, the logic 500 can map the memory storing the compiled data object to a web content process of the web client, as shown at block 510.

Figure 6:
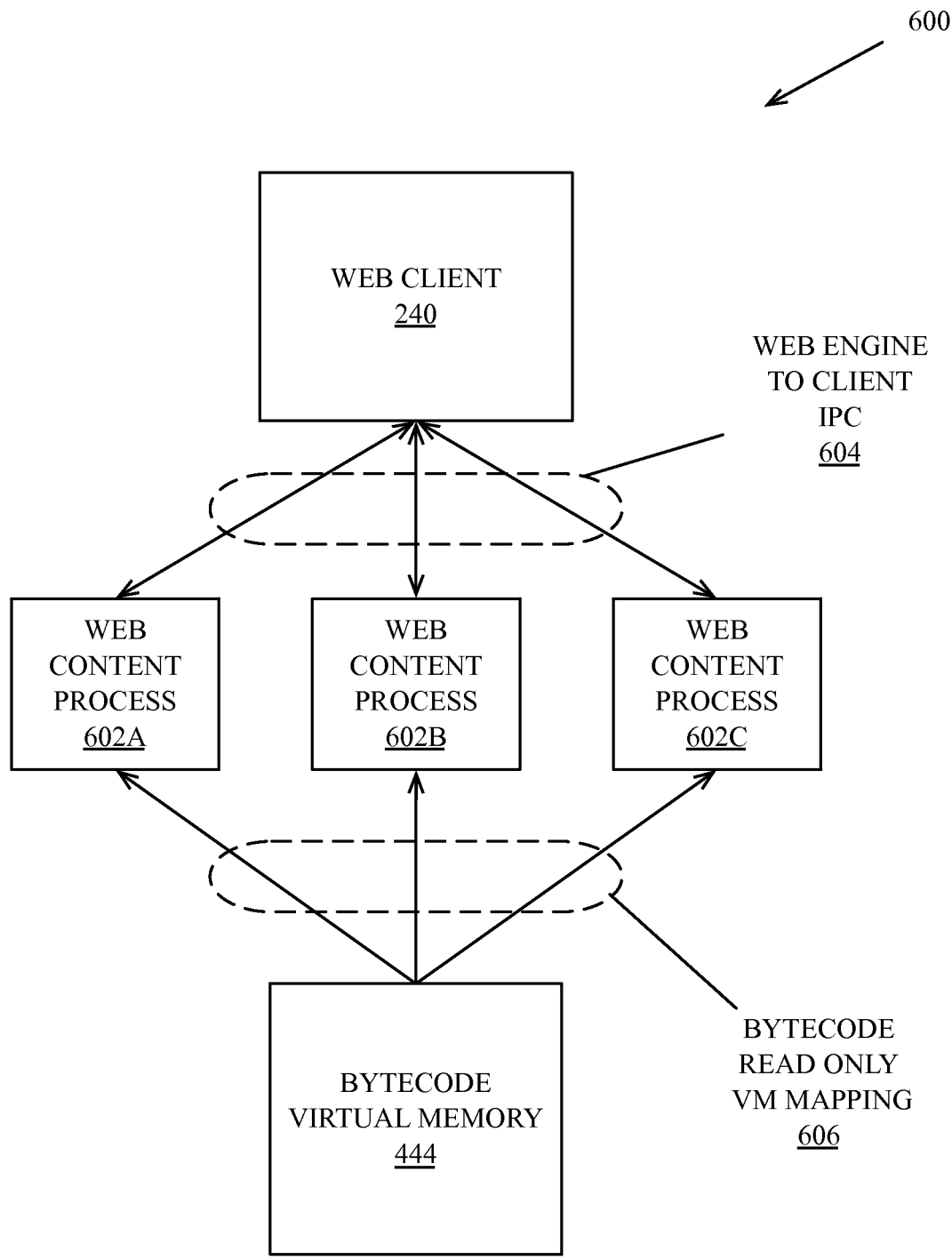
FIG. 6 is a block diagram of system architecture to enable a native web client to filter web resources using a bytecode object compiled from a third-party content filter, according to an embodiment.

FIG. 6 is a block diagram of system architecture 600 to enable a native web client to filter web resources using a bytecode object compiled from a third-party content filter, according to an embodiment. In one embodiment, the architecture 600 includes a split process model, where multiple web content processes 602A-C are associated with the web client 240. Each web content process 602A-C operates in a separate process, and plugins and extensions for the web client operate in web content process space. The web content processes 602A-C are responsible for performing operations to render the web page, including but not limited to JavaScript, HTML, and layout operations.

To perform web content filtering, modification and/or injection, the web client 240 can map virtual memory storing the bytecode for a content filter object (e.g., bytecode virtual memory 444) as a bytecode read only VM Mapping 606. The bytecode read only VM mapping 606 enables the same VM object containing the bytecode for the content filter object to be transparently shared between each web content processor 602A without requiring data to be duplicated across the memory for each process. Each web content process 602A-C can interpret the bytecode for the content filter when retrieving web content for the web client. Accordingly, the actual content filtering is performed by native instructions within the each web content process 602A-C, based on the actions and triggers supplied by the third-party the content filter extensions.

The multiple web client processes 602A-B can communicate with the web client 240 via web engine to client inter-process communication (IPC) 604. In one embodiment, the web engine to client IPC 604 is a conventional inter-process communication mechanism. One embodiment includes support for XPC interprocess communication services via the XPC API. In such embodiment the web engine to client IPC 604 utilizes the XPC interprocess communication service. The web client 240 and each web content process 602A-C can communicate by asynchronous messages handled via one or more dispatch queues.

Additional details regarding the logic associated with the system architecture 600 of FIG. 6 are discussed in FIG. 7 below.

Figure 7:
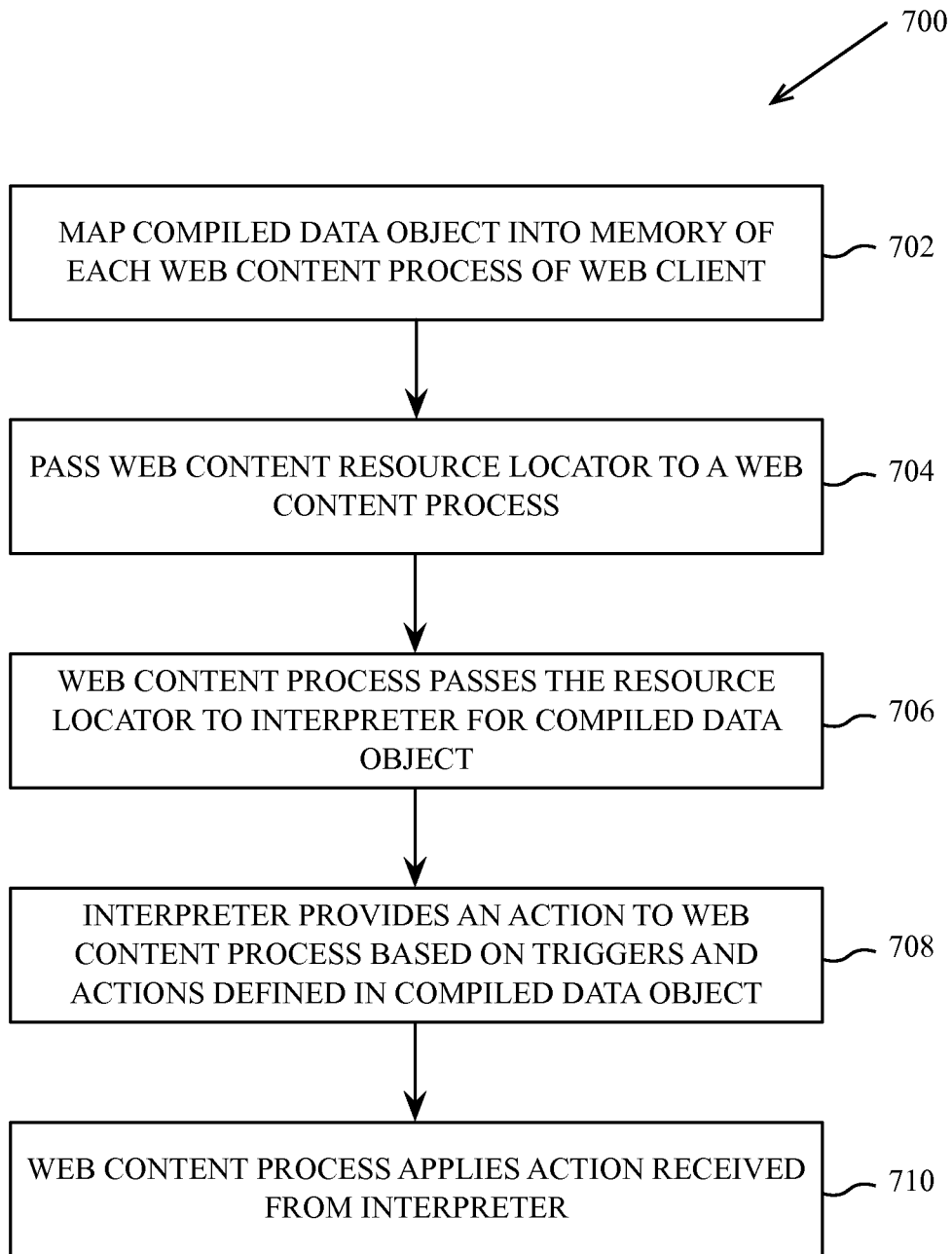
FIG. 7 is a flow diagram of logic performed by a web client system to filter web resources using a bytecode object compiled from a third-party content filter, according to an embodiment.

FIG. 7 is a flow diagram of logic 700 performed by a web client system to filter web resources using a bytecode object compiled from a third-party content filter, according to an embodiment. In one embodiment the logic 700 is performed at least in part by a web client (e.g., web client 240) and at least in part by one of the one or more web client processes 602A-C. However, portions of the logic 700 may also be performed by other components.

In one embodiment, the logic 700 is configured to map a compiled data object into the memory of each web content process of the web client, as shown at block 702. Once the compiled data object is mapped into the memory of each web content process, the logic 700 can pass a web content resource locator to a web content process, as shown at block 704. The web content resource locator can be determined, for example, by the web client in response to input from a graphical interface, or can be programmatically received by the web client from other components executing on the system.

In one embodiment, the web content process passes the resource locator to an interpreter for the compiled data object, as shown at block 706. The interpreter can provide an action to the web content process based on the triggers and actions defined in the compiled data object, as shown at block 708. In one embodiment the interpreter is provided to the web content process within the compiled data object. In such embodiment, the interpreter can be created during the compilation process for the data object. In one embodiment, the interpreter is a component of the web content process that interprets actions and resources provided via the compiled data object.

The interpreter can interpret the actions and resources provided by the compiled data object based on a comparison between the trigger and the resource locator. The trigger can be an explicitly defined trigger or an implied trigger associated with a specific action. Based on the comparison, the interpreter can conditionally provide the action to the web content process, where the action is provided if the resource locator matches the trigger and is not provided if the resource locator does not match the trigger.

The web content process can then apply the action received from the interpreter, as shown at block 710. In one embodiment, the web content process can conditionally apply the action received from the interpreter. In one embodiment the interpreter can provide one or more actions for each resource locator, including blocking the load of the web content based on, for example, a URL-filter or a resource-type filter, blocking the setting or reading of a web cookie associated with the web content, whitelisting specific web content or a set of web content, injecting a style sheet rule, or to attempt to blocking the tracking of browsing activities by a particular website. In one embodiment, whitelisting web content can be performed to cause the web content process to ignore any previously defined for a specific resource or set of resources. Injecting a style sheet rule can be performed to modify the appearance of a particular resource, including cause a particular resource to be loaded, but not displayed.

In one embodiment, an action to attempt to block the tracking of browser activities on the web server can cause a web content process to perform actions including blocking tracking cookies from a website based on a specified URL-filter, or asking specific websites to disable tracking and/or cross-site tracking of individual users. For example and in one embodiment, the web client process, during an HTTP request to a web server, can add a do not track header for websites specified by a URL-filter in the trigger associated with the block-tracking action.

Figure 8:
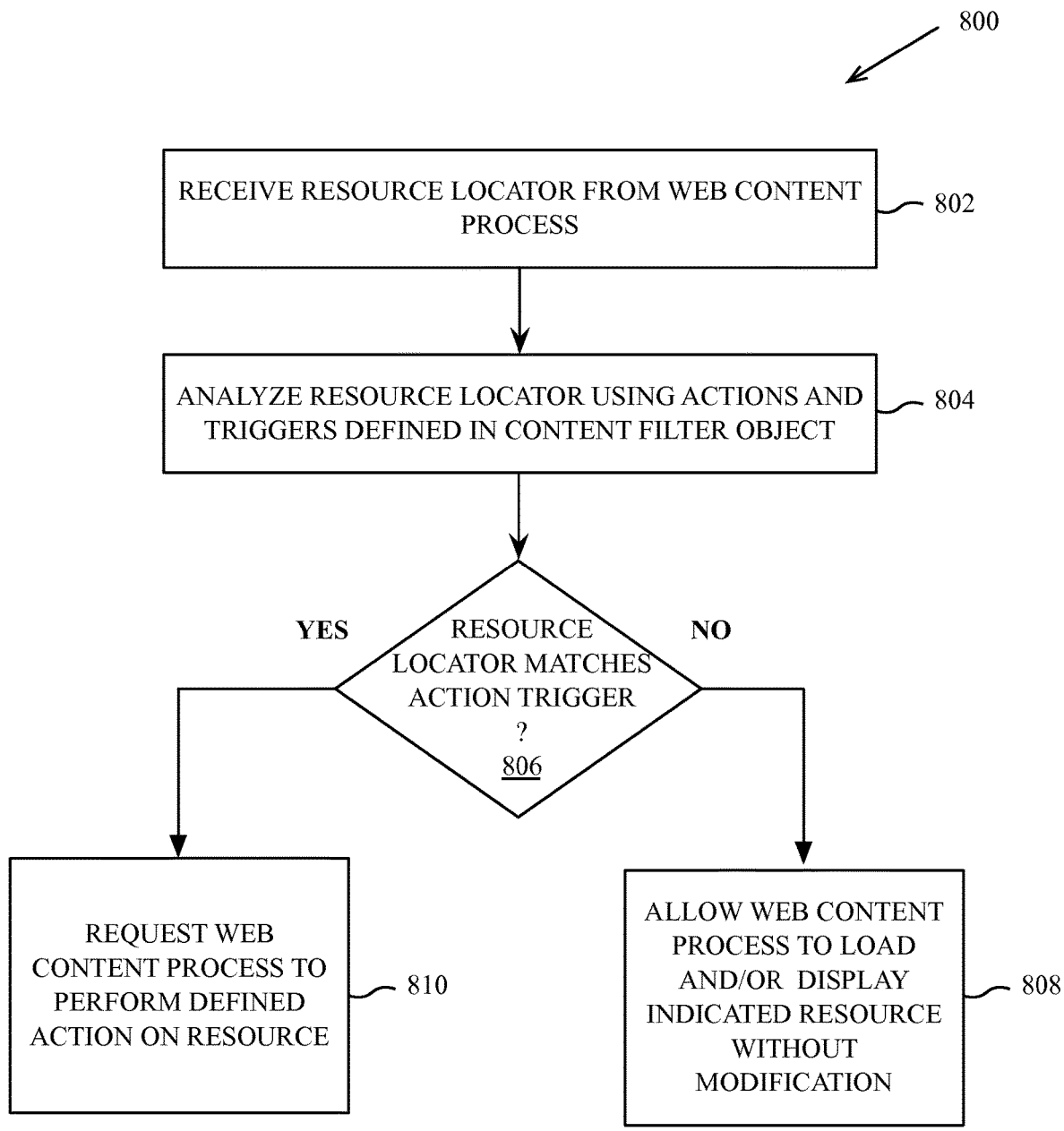
FIG. 8 is a flow diagram of logic to filter web resources using a bytecode object compiled from a third-party content filter, according to an embodiment.

FIG. 8 is a flow diagram of logic 800 to filter web resources using a bytecode object compiled from a third-party content filter, according to an embodiment. In several embodiments, the instructions to perform the operations shown for the logic 800 are included within native code for by the web client system and the extension provide only the actions and triggers used by the native web client system to perform the filter operations. In one embodiment, a bytecode interpreter associated with each content filter object performs the operations of logic 800. In one embodiment, a bytecode interpreter associated with each web content process performs the operations of logic 800. However, other equivalent methods of operations can be employed.

In one embodiment, the logic 800 can receive a resource locator (e.g., URL) from a web content process, as shown at block 802. At block 804, the logic 800 can analyze the resource locator using actions and triggers defined in the content filter object. In one embodiment, the interpreter can be called by the web content process for each resource to be retrieved. In such embodiment, the operations of the interpreter can be restricted to operations that can be performed within a finite period of time, to enable deterministic operation of the web content processes when performing web-content filter operations.

After analyzing the resource locator at block 804, the logic 800 can determine whether the resource locator matches an action and associated trigger at block 806. In one embodiment, the logic 800 performs an action-centric determination, such that each action is evaluated against the resource locator to determine whether the action applies to the resource locator. In one embodiment, the evaluation for each action can be performed in parallel for each resource locator. In one embodiment, the resource locator can be evaluated in parallel against the set of triggers across each action, to determine which of the actions may apply to the resource locator.

If the resource locator does not match the action trigger at block 806, the logic can allow the web content process to load and/or display the indicated resource without modification, as shown at block 808. In one embodiment, if the logic 800 determines at block 806 that the resource locator matches an action trigger, the logic 800 can request for the web content process to perform the defined action on the resource, as shown at block 810. In embodiments in which the logic 800 is performed in a separate process as the web content process, the request can be sent via an inter-process communication method. For block actions, the logic 800 can indicate to the web content process that the content defined resource locator (e.g., image, hypertext document, cookie, etc.) is not to be loaded. In one embodiment, for whitelist actions, the logic 800 can evaluate other actions that might have otherwise been applied. In one embodiment, web content can be altered based on an action, including hiding or re-arranging web content by modifying style-sheet or document object model data for the resource after the resource is retrieved.

Figure 9:
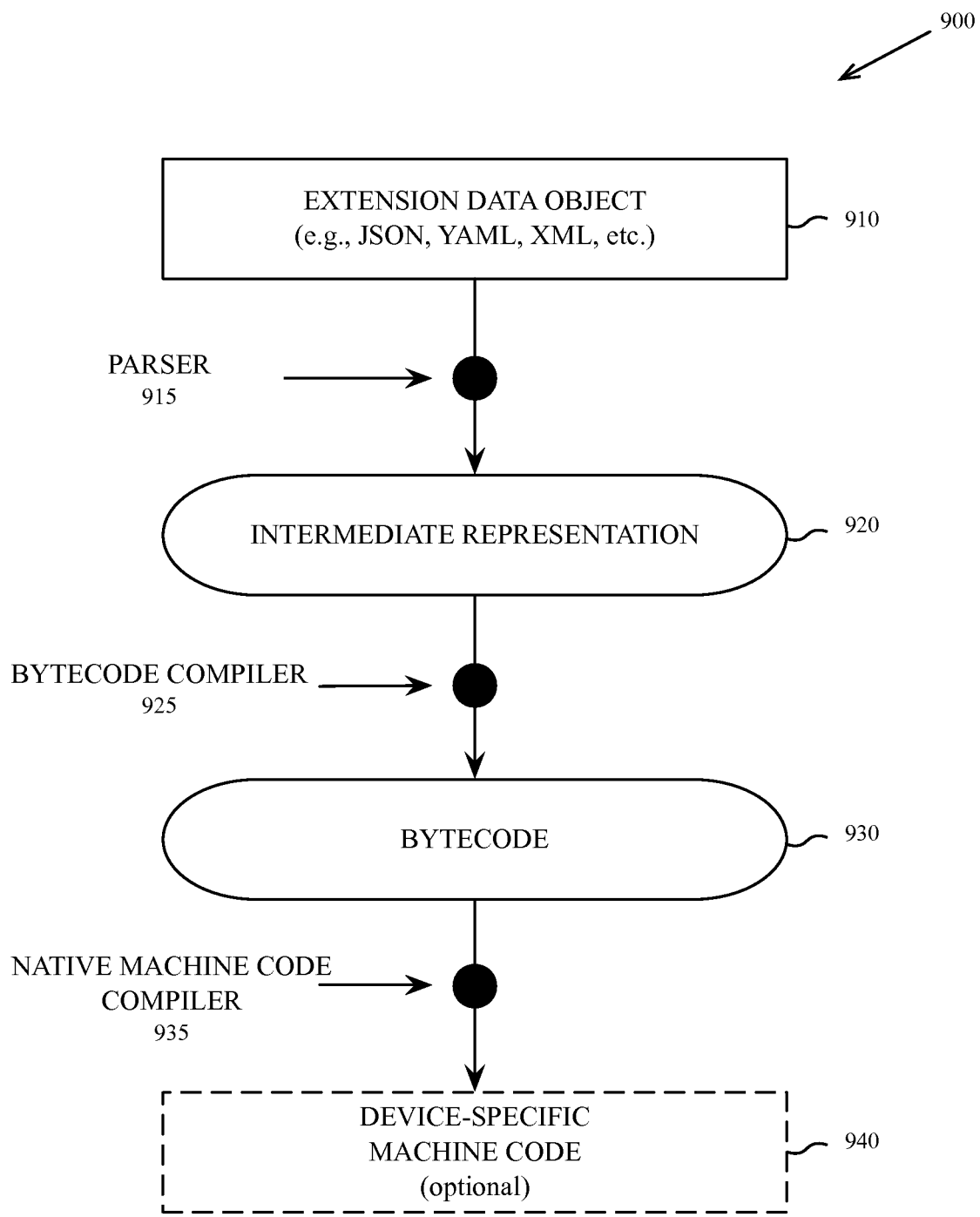
FIG. 9 is a block diagram of a compilation system to compile a third-party content filter object, according to an embodiment.

FIG. 9 is a block diagram of a compilation system 900 to compile a third-party content filter object, according to an embodiment. Compilation of the third-party content filter object can be performed via one or more, or a combination of one or more processes across various systems employed within various embodiments. Accordingly, the illustrated compilation system 900 is intended to be exemplary, rather than limiting.

In one embodiment, the compilation system 900 is a modular compilation system that includes a parser 915, an intermediate assembler 925, and an optional native machine code compiler 935. The object notation format for the extension data object 910 can be any suitable object notation format, including JSON, YAML, or XML, or can be a binary format. The parser 915 can be configured to parse the supported formats for the extension data object 910 to create an intermediate representation 920. In one embodiment, the extension data object 910 is a JSON object that can be parsed into JavaScript object. In one embodiment, the compilation system 900 is an LLVM based compilation system and the parser can parse the extension data object 910 into an intermediate representation 920 in memory.

In one embodiment, bytecode compiler 925 can further assemble the intermediate representation 920 into bytecode 930. In one embodiment, the bytecode 930 is at least a component of the compiled object (e.g., compiled data object 135 of FIG. 1B) that is stored and mapped to the web content processes. In one embodiment, at least a portion of the bytecode 930 can be further compiled by a native machine code compiler into device-specific machine code 940 that may be directly executed by a processor.

Figure 10:
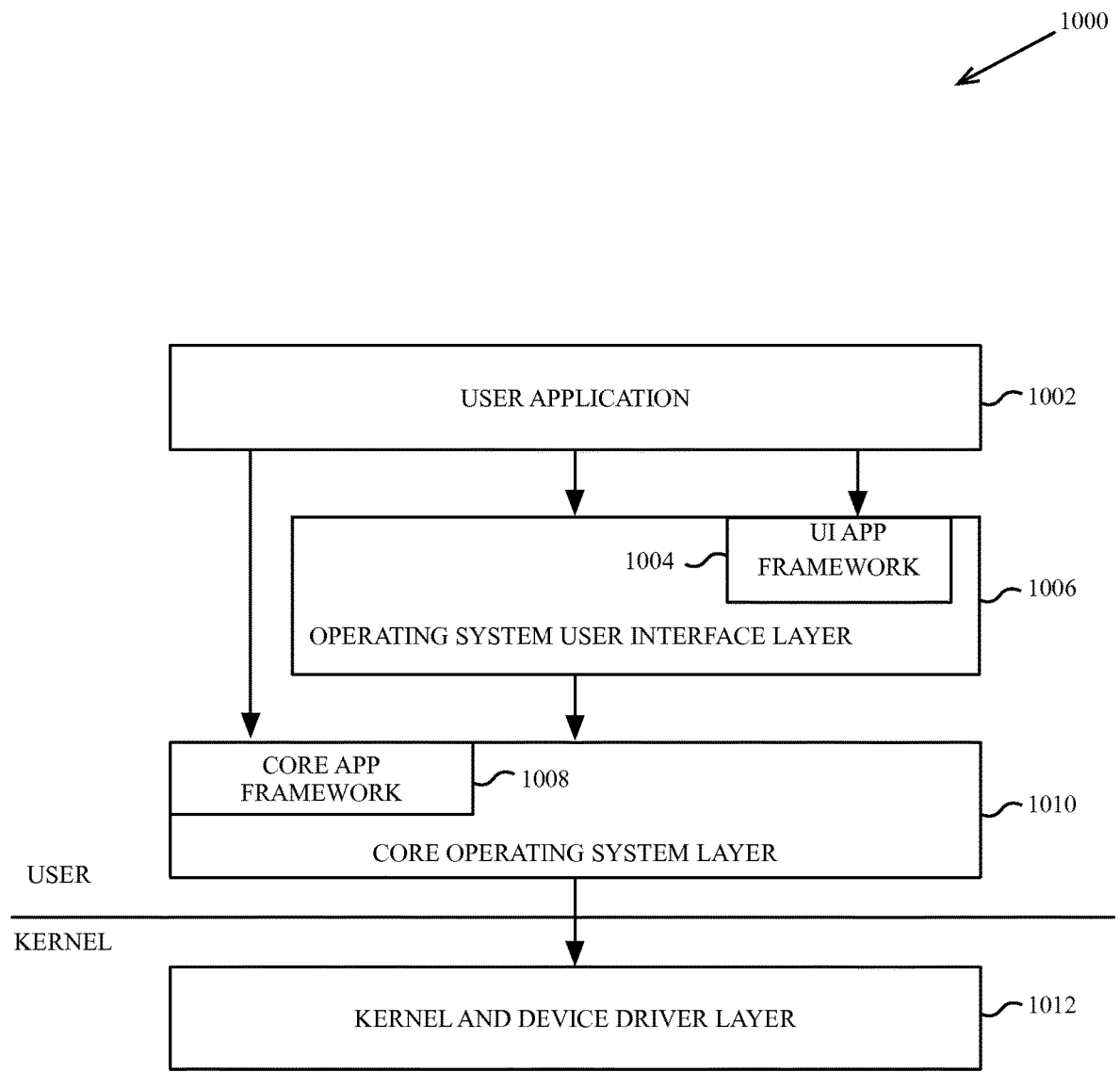
FIG. 10 is a block diagram of a multi-layer software architecture used by a data processing system, according to an embodiment.

FIG. 10 is a block diagram of a multi-layer software architecture 1000 used by a data processing system, according to an embodiment. The software components are illustrated with a division between user space and a kernel space. Although other arrangements are possible, user applications (e.g., user application 1002), and some operating system components (e.g., operating system user interface layer 1006, and the core operating system layer 1010) execute in user space. In kernel space, the operating system kernel and a set of device drivers operate in the kernel and device driver layer 1012. The kernel and device driver layer 1012 manage the underlying functionality of the overall operating system and provide a formalized and secure mechanism for user space software to access data processing system hardware. The kernel and device driver layer 1012 can additionally include elements in support of the XPC interprocess communication technology supported by some embodiments, to provide a secure mechanism to exchange information with third-party extensions. Equivalent layers to the kernel and device driver layer 1012 of other implementations can also be used to facilitate conventional interprocess communication mechanisms.

A user interface (UI) application (app) framework 1004 provides a mechanism for the user application 1002 to access UI services provided by the operating system (OS) UI layer 1006. Underlying operating system functions that are not related to the user interface are performed in the core operating system layer 1010. One or more data management frameworks, such as a core app framework 1008 can be made available to a user application to facilitate access to operating system functions.

The exemplary user application 1002 may be any one of a plurality of user applications, including the web browser described herein. The user application 1002 can include multiple separate processes. For example, the web browser as described herein can include several processes, such as a front-end web client process and one or more web content processes, such as the web client 240 and web content process 602A show in in FIG. 6. The user application 1002 can also be a document viewer, a picture viewer, a movie player, a word processing or text editing application, an email application, or other applications capable of accessing remote hypertext or web-based resources. The user application 1002 can access instructions in an exemplary UI app framework 1004 for creating and drawing graphical user interface objects such as icons, buttons, windows, dialogs, controls, menus, and other user interface elements. The UI app framework 1004 also provides additional functionality including menu management, window management, and document management, as well as file open and save dialogs, drag-and-drop, and copy-and-paste handling.

The core operating system layer 1010 contains operating system components that implement features including and related to application security, system configuration, graphics and media hardware acceleration, and directory services. Multiple application frameworks, including the core app framework 1008, provide a set of APIs to enable a user application 1002 to access core services that are essential to the application, but are not directly related to the user interface of the application. The core app framework 1008 can facilitate an application's access to database services, credential and security services, backup services, data synchronization services, and other underlying functionality that may be useful to an application.

The core app framework 1008, or equivalent application frameworks, can provide access to remote server based storage for functionality including synchronized document storage, key-value storage, and database services. Key-value storage allows a user application 1002 to share small amounts of data such as user preferences or bookmarks among multiple instances of the user application 1002 across multiple client devices. The user application 1002 can also access server-based, multi-device database solutions via the core app framework 1008.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 11:
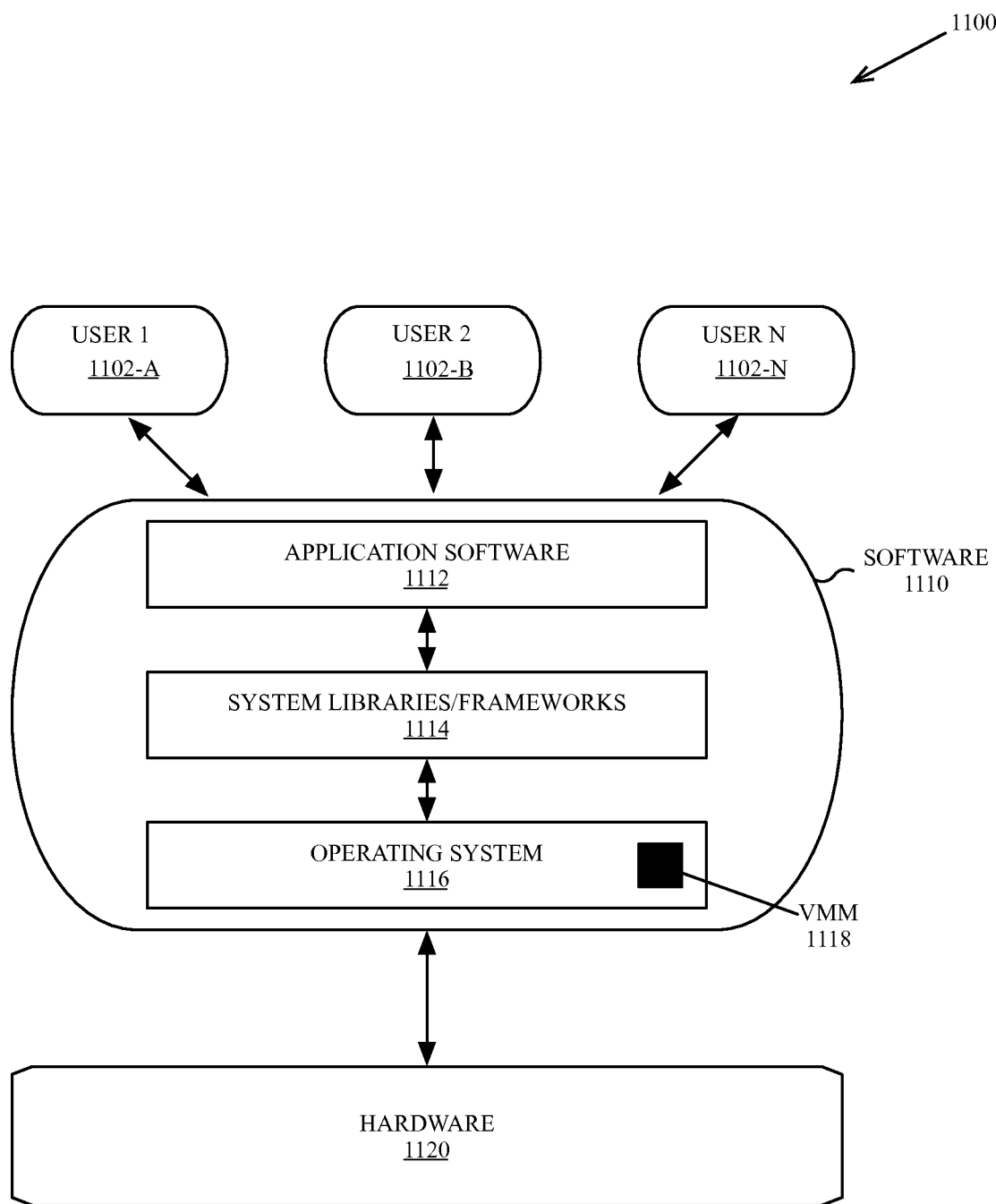
FIG. 11 is a block diagram of a multi-user software architecture used by a data processing system, according to an embodiment.

FIG. 11 is a block diagram of a multi-user software architecture 1100 used by a data processing system, according to an embodiment. In one embodiment, the data processing systems described herein can include various software 1110 and hardware 1120 components configured to support multi-user data processing for 1 to N users (e.g., User 1 1102-A, User 2, 1102-B, User N 1102-N). The users access application software 1112 (e.g., user application 1002 as in FIG. 10) through a user interface provided by an operating system (OS) 1116. The application software 1112 can use system libraries or frameworks 1114 as abstractions to functionality exposed by the core levels of the OS 1116.

The operating system can additionally include a virtual memory manager (VMM) 1118 to manage virtual memory spaces presented to each process of the application software 1112. In one embodiment, the VMM 1118 can be used to map the compiled bytecode of the content filter extension object into virtual memory, and share the virtual memory of the bytecode with a web content process (e.g., web content process 602A-C, as shown in FIG. 6). The mapping can be performed such that each reference to the virtual memory addresses storing the bytecode that defines the actions and triggers used by the content filter logic is satisfied by the same virtual memory object, even though the virtual memory addresses supplied to each web content process differs. The virtual memory can be mapped as read-only to each web content process, such that the web content processes cannot modify the memory.

Figure 12:
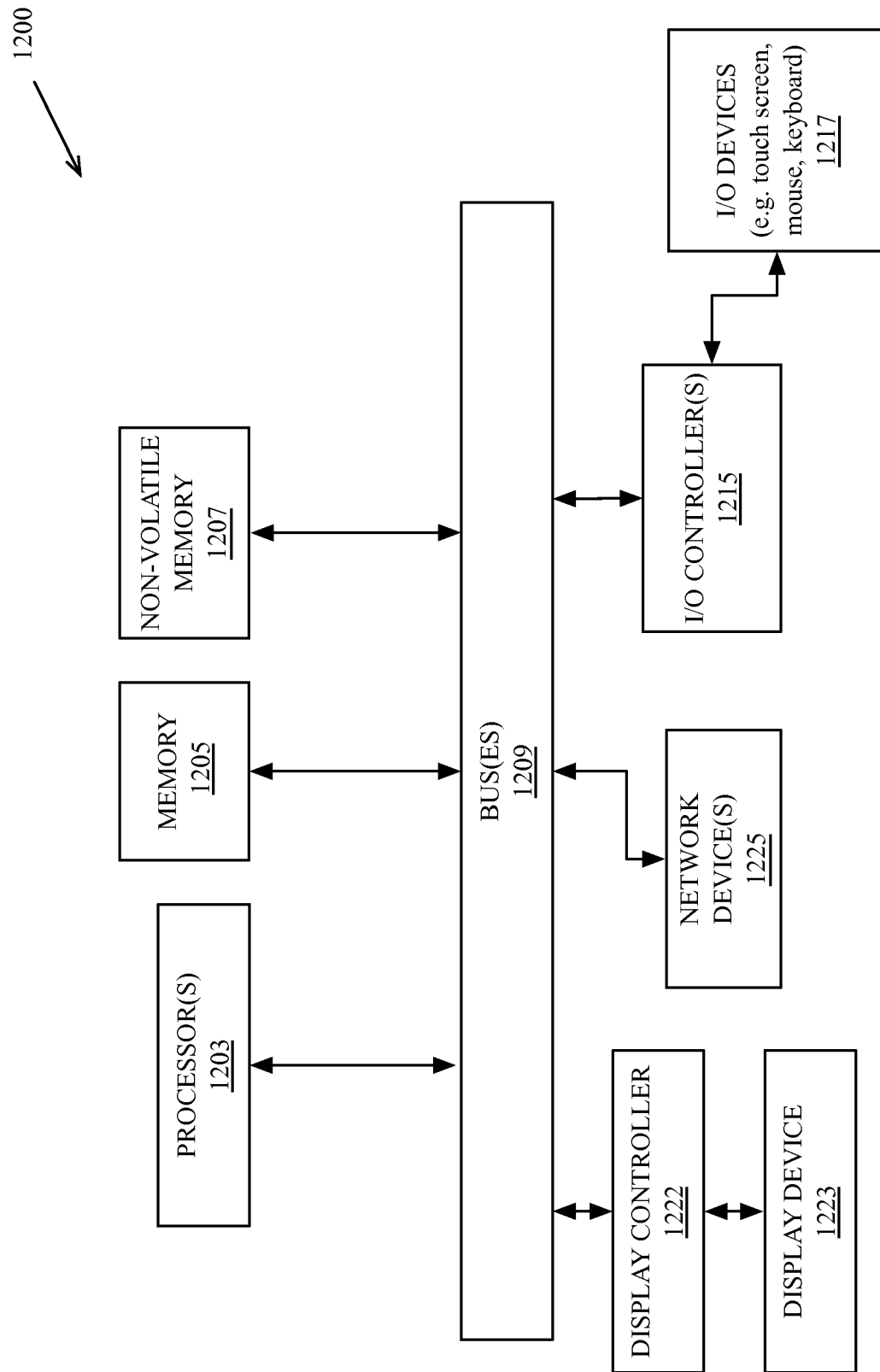
FIG. 12 is a block diagram of data processing system hardware according to an embodiment.

FIG. 12 is a block diagram of data processing system hardware 1200 according to an embodiment. Note that while FIG. 12 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown can also be used within the various embodiments.

The data processing system 1200 includes one or more bus(es) 1209 that serve to interconnect the various components of the system. One or more processors 1203 are coupled to the one or more bus(es) 1209 as is known in the art. Memory 1205 may be volatile DRAM or non-volatile RAM, such as NOR flash memory or other types of high-speed, non-volatile, execute-in-place memory. This memory can be coupled to the one or more bus(es) 1209 using techniques known in the art. The data processing system can also include explicitly non-volatile memory 1207, such as data storage devices including one or more hard disk drives, flash memory devices or other types of memory systems that maintain data after power is removed from the system. The non-volatile memory 1207 and the memory 1205 can each couple to the one or more bus(es) 1209 using known interfaces and connection techniques. A display controller 1222 can couple to the one or more bus(es) 1209 to receive display data, which can be displayed on a display device 1233. In one embodiment the display device 1223 includes an integrated touch input to provide a touch screen.

The data processing system can also include one or more input/output (I/O) controllers 1215 which provide interfaces for one or more I/O devices, such as one or more mice, touch screens, touch pads, joysticks, and other input devices including those known in the art and output devices (e.g. speakers). The input/output devices 1217 are coupled through one or more I/O controllers 1215 as is known in the art.

While the data processing system 1200 illustrates the memory 1205 and non-volatile memory 1207 as coupled to the one or more buses directly, in one embodiment the non-volatile memory 1207 can be remote from the system 1200, such as in a network storage device which is coupled to the data processing system through a network interface such as a modem, wireless LAN, or Ethernet interface. The bus(es) 1209 can be connected to each other through various bridges, controllers and/or adapters as is well known in the art. In one embodiment the I/O controller 1215 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1225 can be coupled to the bus(es) 1209. The network device(s) 1225 can be wired network devices (e.g., Ethernet) or wireless network devices (e.g., WI-FI, Bluetooth).

Figure 13:
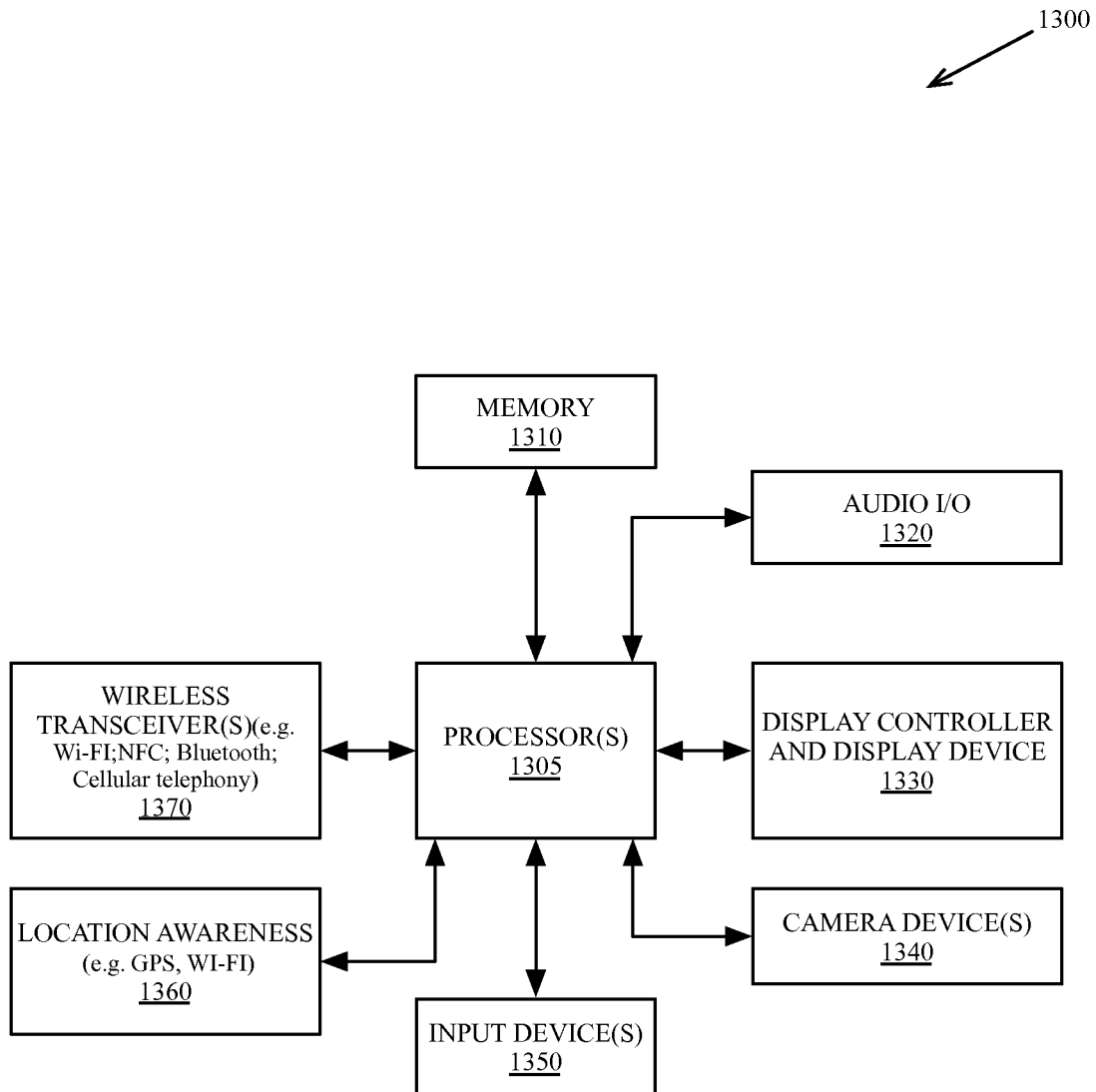
FIG. 13 is a block diagram of an additional data processing system, according to an embodiment.

FIG. 13 is a block diagram of an additional data processing system 1300, according to an embodiment. The data processing system 1300 illustrated can include hardware components that are optimized for use in mobile or handheld devices, and may be included within a system on a chip integrated circuit. One or more buses or interfaces that are not shown can be used to interconnect the various components, as known in the art. An electronic device constructed using the illustrated data processing system may include additional or fewer components than shown.

The data processing system 1300 can include a processing system having one or more processor(s) 1305, as well as memory 1310 for storing data and programs for execution. In one embodiment, each of the one or more processor(s) can include one or more processor cores. An audio I/O subsystem 1320 is included, which may include a microphone and a speaker for telephone or video conferencing or for the recording and playback of music.

A display controller and display device 1330 can be included to provide a graphical user interface for the user, and a wireless transceiver 1370 may be available to transmit and receive data via one or more wireless technologies, such as Wi-Fi, infrared, Bluetooth, or one or more variants of wireless radio technology. The system can contain one or more camera devices 1340 in both a front and rear facing configuration, though similarly configured systems each with only a front facing camera or rear facing camera can be one of many optimal configurations. The data processing system also includes one or more input devices 1350 to enable a user to provide input to the system. Input devices may include a keypad or keyboard, alone or in conjunction with a touch or multi touch panel that is overlaid on the display device 1330. In one embodiment, the display device and touch panel can be adjusted in real time using factory-generated calibration data. The data processing system can also include a device for providing location awareness services 1360 via a Global Positioning System (GPS) device, WI-FI location awareness, or an equivalent service.

It will be apparent from this description that aspects of the present invention may be embodied, at least in part, in software. That is, the techniques may be carried out in a data processing system in response to its processor executing a sequence of instructions contained in a storage medium, such as embody a non-transitory machine-readable storage medium. In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

As described herein, one embodiment is a non-transitory computer readable medium storing instructions which, when executed by one or more processors of a data processing system, cause the one or more processors to perform several operations related to a web resource load blocking API. The operations comprise, but are not limited to requesting a web content extension via a content extension programming interface, receiving a data object in response to the request, the data object including one or more actions, each action having zero or more triggers, and where an action can have an implicit trigger that is not explicitly specified. The operations further comprise, compiling the data object into a compiled data object, storing the compiled data object in memory, and mapping the memory storing the compiled data object into an address space of a web content process associated with a web client. In one embodiment the web content process is configured to perform the one or more of the actions defined in the data object in response to the zero or more triggers.

In one embodiment, requesting the web content extension includes requesting the web content extension from a third-party application, where the third-party application provides the data object in response to the request and terminates execution after providing the data object. Requesting the web content extension can be performed in response to a system-wide request to enable extensions on the data processing system and the data object received in response to the request, in one embodiment, is JSON data including the one or more actions and associated triggers.

In one embodiment, compiling the data object into a compiled data object includes compiling the data object into interpreted bytecode and storing the compiled data object in memory includes storing the compiled data object to a file system on a non-volatile memory device. In one embodiment, mapping the memory storing the data object to the web content process includes creating a virtual memory object backed by the compiled data object and mapping the virtual memory object into virtual memory address space of the web content process, where the web content process is a web content engine of the web client, the web content engine to load and process web content for the web client, and the client is a native web client of the data processing system.

In one embodiment, the operations further comprise mapping the compiled data object into the virtual memory address space of each web content process of the web client and passing a web content resource locator to at least one web content process. In one embodiment, the operations further comprise applying the one or more actions to the web content resource locator based on the zero or more triggers associated with each of the one or more action, the one or more actions including at least one of blocking loading of web content, blocking the setting or reading of a web cookie associated with the web content, whitelisting web content, injecting a style sheet rule, or blocking tracking of browsing activities, and where an action can have an implicit trigger.

One embodiment is a machine implemented method on an electronic device having one or more processors, where the method comprises receiving a request to load a web content resource, deriving an action and a trigger from a memory mapped data object associated with a web content filter extension, comparing attributes of the web content resource to the trigger, and applying the action based on the comparing, the action including blocking load of the web content resource. In one embodiment, the method further comprises passing the attributes of the web content resource to a bytecode interpreter, wherein deriving the action and the trigger from the memory mapped data object includes interpreting bytecode of the memory mapped data object. In one embodiment, comparing the attributes of the web content resource to the trigger includes comparing the web content resource to the trigger within the bytecode interpreter, wherein the attributes of the web content resource include a locator and a type. In one embodiment, blocking the load of the web content resource includes preventing download of the web content resource from a remote content source, the web content resource including a hypertext document or an image. In one embodiment, the action includes blocking the setting or reading of a web cookie associated with the content source.

In one embodiment, the action additionally includes blocking display of the web content resource or attempting to block tracking of browsing activities. Blocking the display of the web content resource can include, after downloading the web content resource, injecting a style sheet rule to prevent the web content resource from displaying on a web client.

One embodiment is a data processing system comprising one or more processors coupled to memory, where the one or more processors are to execute instructions from the memory, and the instructions to cause the one or more processors to perform operations for a plurality of processes including a web client process to request a web content extension, receive a content extension filter object in response to the request, compile the content extension filter object into a compiled content extension filter object, and cause the compiled content extension filter object to be mapped to a virtual memory address, and one or more web content processes to load web content on behalf of the web client process, the one or more web content processes having access to the virtual memory address of the compiled content extension filter object, wherein the one or more web content processes are to compare web content resources to zero or more triggers defined in the compiled content extension filter object and apply one or more actions to the web content based on a comparison. In one embodiment, where zero triggers are defined for an action in the compiled content, the comparison can be to an implicit trigger not explicitly specified in the content filter extension object.

In one embodiment, the compiled content extension filter object is bytecode that is interpreted by a bytecode interpreter on behalf of the one or more web content processes and the web client process is associated with a WebKit-based web client. In one embodiment, each of the one or more web content processes has read-only access to the virtual memory address of the compiled content extension filter object. In one embodiment, the one or more actions applied to the web content processes include to block load of web content, block setting or reading of a web cookie associated with the web content, whitelist web content, inject a style sheet rule into the web content, and block tracking by a provider of the web content. In one embodiment, the content extension filter object includes JavaScript Object Notation (JSON) data, although the content extension filter object can be some other type of format, including a binary format.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein. Various components can be a means for performing the operations or functions described.

Besides what is described herein, various modifications can be made to the disclosed embodiments and implementations without departing from their scope. Therefore, the illustrations and examples herein should be construed in an illustrative, and not a restrictive sense. The scope and spirit of the various embodiments should be measured solely by reference to the claims that follow.

What is claimed is:

1. A non-transitory computer readable medium storing instructions which, when executed by one or more processors of a data processing system, cause the one or more processors to perform operations comprising:
    requesting a web content filter extension via a content extension programming interface;
    receiving a data object in response to the request, the data object including one or more actions, each action having zero or more triggers;
    compiling the data object into a compiled data object;
    storing the compiled data object in memory;
    creating a virtual memory object backed by the compiled data object; and
    mapping the virtual memory object into a virtual memory address space of a web content process associated with a web client, the web content process to perform the one or more actions defined in the data object.

2. The medium as in claim 1, wherein requesting the web content filter extension includes requesting the web content filter extension from a third-party application, the third-party application to provide the data object in response to the request and terminate execution after providing the data object.

3. The medium as in claim 2, wherein requesting the web content filter extension is performed in response to a system-wide request to enable extensions on the data processing system.

4. The medium as in claim 1, wherein receiving the data object in response to the request includes receiving JavaScript Object Notation (JSON) data including the one or more actions and associated triggers.

5. The medium as in claim 1, wherein compiling the data object into the compiled data object includes compiling the data object into interpreted bytecode.

6. The medium as in claim 1, wherein storing the compiled data object in the memory includes storing the compiled data object to a file system on a non-volatile memory device.

7. The medium as in claim 1, wherein the web content process is a web content engine of the web client, the web content engine to load and process web content for the web client, and wherein the client is a native web client of the data processing system.

8. The medium as in claim 7, further comprising:
    mapping the compiled data object into the virtual memory address space of each web content process of the web client; and
    passing a web content resource locator to at least one web content process.

9. The medium as in claim 8, further comprising:
    applying the one or more actions to the web content resource locator based on the zero or more triggers associated with each of the one or more actions, the one or more actions including at least one of blocking loading of web content, blocking a setting or reading of a web cookie associated with the web content, whitelisting web content, injecting a style sheet rule.

10. A data processing system comprising:
    one or more processors coupled to memory, the one or more processors to execute instructions from the memory, the instructions to cause the one or more processors to perform operations for a plurality of processes including:
    a web client process to request a web content filter extension, receive a content extension filter object in response to the request, compile the content extension filter object into a compiled content extension filter object, and cause the compiled content extension object to be stored in memory as a compiled data object, create a virtual memory object backed by the compiled data object, the virtual memory object mapped to a virtual memory address space of a web client process associated with the web client; and
    one or more web content processes to load web content on behalf of the web client process, the one or more web content processes having access to the virtual memory address of the compiled content extension filter object, wherein the one or more web content processes are to compare web content resources to one or more triggers and apply one or more actions to the web content based on a comparison.

11. The system as in claim 10, wherein the compiled content extension object is bytecode that is interpreted by a byte code interpreter on behalf of the one or more web content processes.

12. The system as in claim 10, wherein the web client process is associated with a WebKit-based web client.

13. The system as in claim 10, wherein each of the one or more web content processes has read-only access to the virtual memory address of the compiled content extension filter object.

14. The system as in claim 10, wherein the one or more actions applied to the web content processes include to block load of web content, block load of a web cookie associated with the web content, whitelist web content, inject a style sheet rule into the web content, and block tracking by a provider of the web content.

15. The system as in claim 10, wherein the content extension filter object includes JavaScript Object Notation (JSON) data.

* * * * *